United States Patent [19]

Skala

[11] 4,402,188
[45] Sep. 6, 1983

[54] NESTED THERMAL RESERVOIRS WITH HEAT PUMPING THEREBETWEEN

[76] Inventor: Stephen F. Skala, 3839 S. Wenonah Ave., Berwyn, Ill. 60402

[21] Appl. No.: 307,757

[22] Filed: Oct. 1, 1981

Related U.S. Application Data

[63] Continuation-in-part of Ser. No. 56,739, Jul. 11, 1979, abandoned.

[51] Int. Cl.³ .............................................. F25B 27/02
[52] U.S. Cl. ........................................ 62/56; 62/238.6; 62/430; 62/238.7; 165/10; 165/104.11; 165/18; 165/48 R
[58] Field of Search ............... 165/18, 48, 104.11, 165/10; 62/3, 56, 324.1, 238.7, 238.6, 430, 437; 237/2 B

[56] References Cited

U.S. PATENT DOCUMENTS

| | | | |
|---|---|---|---|
| 2,713,252 | 7/1955 | Jackson et al. | 165/18 |
| 3,780,356 | 12/1973 | Laing | 165/10 X |
| 4,063,546 | 12/1977 | Schmid et al. | 165/10 X |
| 4,170,261 | 10/1979 | Laing et al. | 165/10 X |
| 4,219,076 | 8/1980 | Robinson, Jr. | 165/104.11 X |

FOREIGN PATENT DOCUMENTS 2000859 1/1979 United Kingdom ............... 62/238.6

Primary Examiner—Albert W. Davis, Jr.
Attorney, Agent, or Firm—Stephen F. Skala

[57] ABSTRACT

An assembly of nested thermal reservoirs has an inner reservoir at an extreme temperature surrounded by one or more reservoirs at moderate temperatures. Over time, heat flow would equilibrate reservoir temperatures thereby loosing available thermal energy. At least a portion of the heat lost by the inner to an outer reservoir is restored by a heat pump operating therebetween.

5 Claims, 3 Drawing Figures

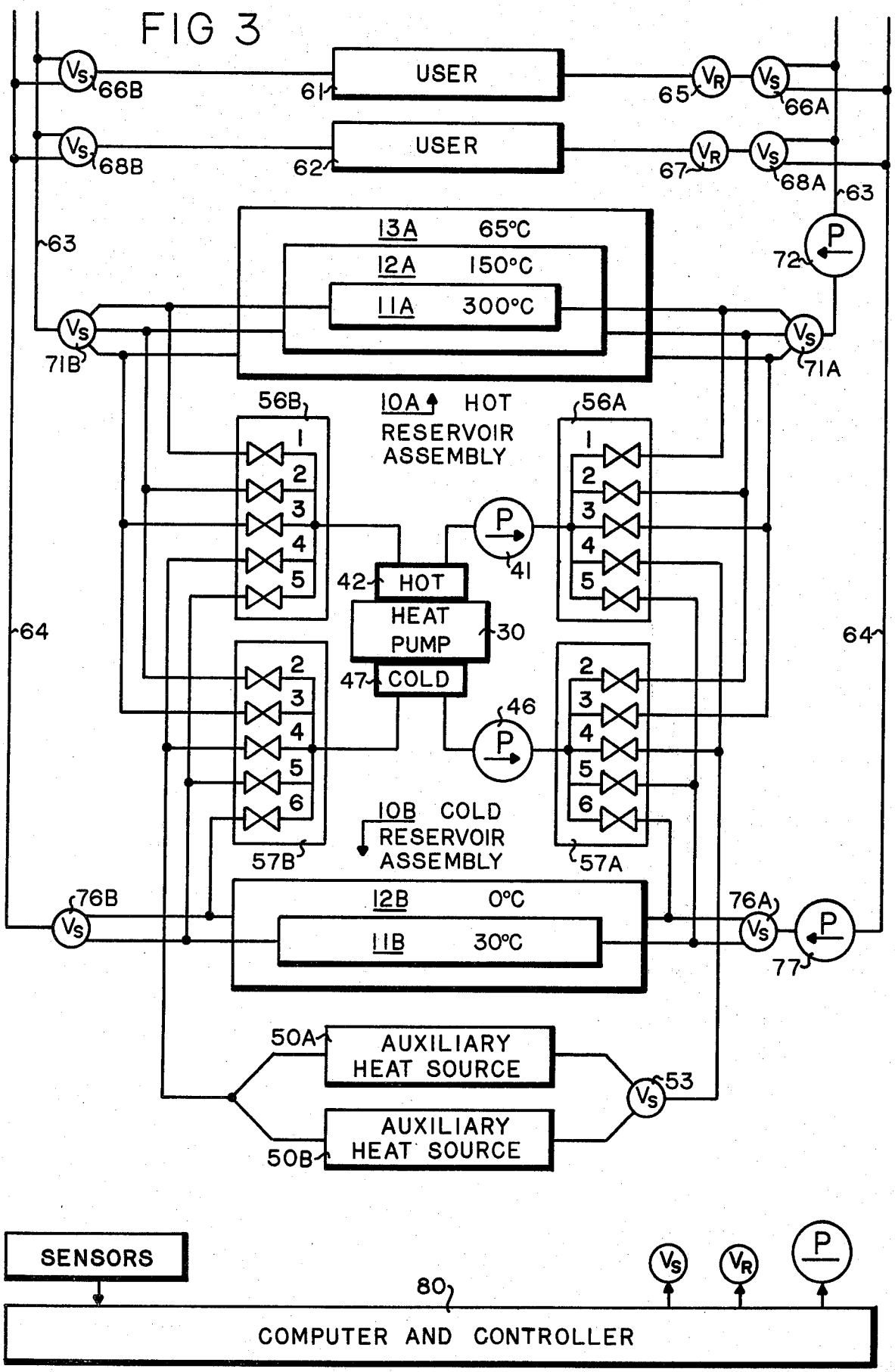

NESTED THERMAL RESERVOIRS WITH HEAT PUMPING THEREBETWEEN

BACKGROUND

The present application is a continuation-in-part of Ser. No. 56,739 filed July 11, 1979 and now abandoned.

This invention relates to transfer of heat by a heat pump between thermal reservoirs in a nested configuration.

A particular application for the thermal reservoirs and heat pump of the invention is a system of domestic appliances disclosed in my U.S. Pat. No. 4,173,993 wherein a liquid phase thermal exchange fluid is forced to circulate in paths which include cooking appliances and thermal reservoirs. The appliances are characterized as intermittent users having a range of operating temperatures. Temperature inputs to the appliances may range from an extreme of 300° C. for roasting through a more moderate 150° C. for pressure cooking to a yet more moderate 65° C. for maintaining food at a serving temperature. Temperature inputs to cooling appliances may range from an extreme of −30° C. for freezing to a moderate 0° C. for refrigeration.

Among various thermal sources, heat pumps can approach an optimal energy efficiency over a wide range of hot and cold temperatures. The theoretical coefficient of performance, $C_p$, of a heat pump operating in a reverse Carnot cycle is expressed in terms of absolute temperature of a heat source, $T_c$, and absolute temperature of a heat sink, $T_h$, by $C_p = T_h/(T_h - T_c)$. As an example, a heat pump operating in ambient air to generate heat at a temperature of 150° C. has a theoretical $C_p$ of 3.25. Practical heat pumps have a coefficient of performance ranging from 40% to 75% of theoretical so that in the example of 150° C., the heat would be transferred at a practical Cp of 1.3 to 2.4

High peak thermal capacity is attained with heat pumps of moderate powr by combining them with thermal reservoirs for charging over extended periods. In order to approach the high energy efficiency indicated by the Cp for practical heat pumps, a thermal system includes a plurality of thermal reservoirs spanning a range of temperatures. A user selects for heat exchange the reservoir having the most moderate temperature which satisfies the user's current temperature requirement. Although the user could exchange the same quantity of heat with a reservoir at a more extreme temperature, such heat would have been developed at a lower energy efficiency.

Although highly effective thermal insulating systems such as evacuated multilayers can reduce heat loss to low levels, the more economical conventional insulations loose substantial quantities of heat to surrounding media. A nested configuration wherein a reservoir at an extreme temperature is surrounded by one or more reservoirs at progressively more moderate temperatures reduces the heat loss by a reduced temperature differential across the insulation. The heat which does flow at the reduced rate is substantially retained by surrounding reservoirs and can be used, but it is desirable to balance the charge of the reservoirs at a high energy efficiency for anticipated user demand.

Thermal storage systems having more than two reservoirs may include several heat pumps, each of which charges one of the reservoirs. In systems such as the cited domestic appliance system wherein a common heat exchange fluid exchanges heat between reservoirs and users, it would be desirable to provide fluid circuits to enable a single heat pump to charge a plurality of reservoirs.

OBJECTS AND SUMMARY

It is an object of the invention to provide an improved energy efficient thermal storage system and charging means therefor wherein heat flowing to a reservoir at a moderate temperature in a nested assembly of reservoirs is returned to a reservoir at a more extreme temperature thereby maintaining a balance of predetermined levels of charge.

It is another object to provide heat exchange between a plurality of reservoirs by a single heat pump.

These and other objects and advantages which will become apparent are attained by the invention wherein a heat pump transfers heat among thermal reservoirs which are in a nested configuration. Heat flows continuously to discharge an inner reservoir at an extreme temperature while the surrounding reservoir may become charged in excess of potential demand. Of various thermal sources, the moderate temperature reservoir normally has the smallest temperature difference with the extreme temperature reservoir and accordingly provides the highest value of Cp.

DESCRIPTION OF THE DRAWINGS

FIG. 3 is a schematic drawing showing the nested reservoirs and heat pump according to the invention incorporated into a system of domestic appliances.

FIG. 1 comprises an assembly of nested thermal reservoirs 10, a heat pump 10, and fluid circuits through which a thermal exchange fluid is forced to circulate for heat exchange between the heat pump and the reservoirs.

Figure 1:
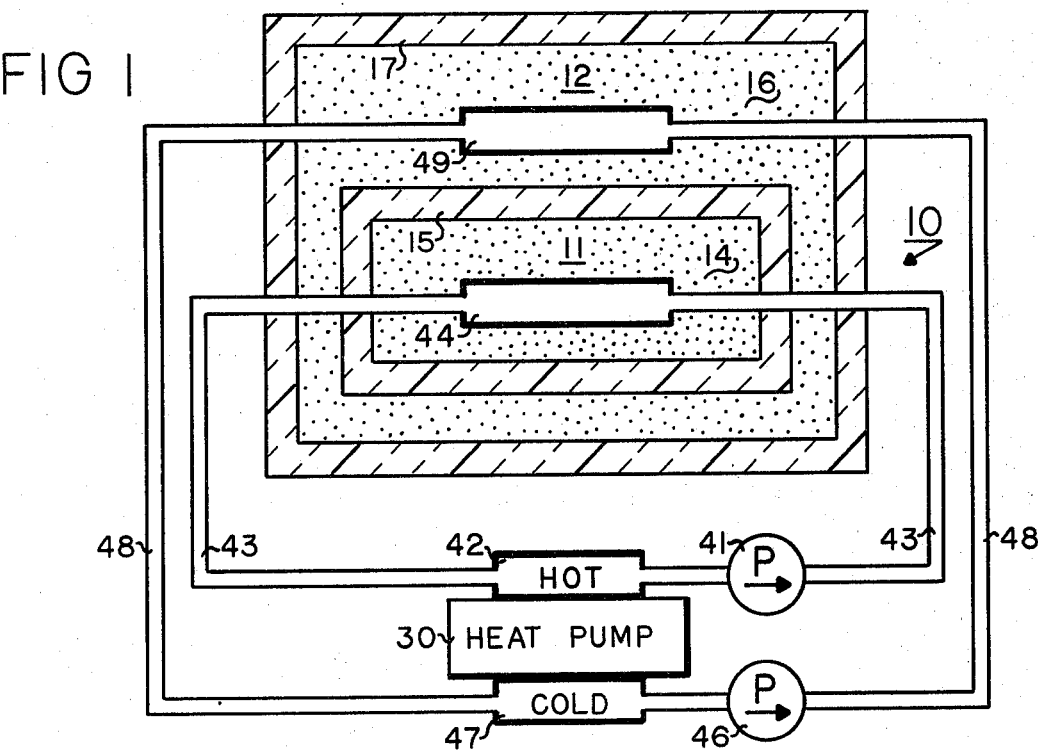
FIG. 1 is a diagrammatic drawing partly in side section showing an elementary embodiment of the invention wherein heat is transferred by a heat pump to restore a balance of charge between reservoirs in a nested configuration.

An inner reservoir 11 comprises a heat storing material 14 which is enclosed by a thermal insulator 15. A surrounding reservoir 12 comprises a heat storing material 16 which is enclosed by a thermal insulation 17. Heat storage as latent heat of phase transition is preferred for large thermal capacity at a predetermined temperature. Latent heat storing material 14 of the inner reservoir has its phase transition at an extreme temperature and latent heat storing material 16 of the surrounding reservoir has its phase transition at a moderate temperature.

A heat pump 30 may be any of the known thermoelectric or mechanical devices which transfer heat from a source to a higher temperature sink. When operating, these devices develop a hot surface and a cold surface. Conventionally, a condensible gaseous working fluid is compressed to form a liquid phase as it releases heat to the hot surface and the liquid working fluid absorbs heat from the cold surface as it evaporates to its gaseous phase. An alternative and preferred heat pump is based on a noncondensible gaseous working fluid in a reverse Carnot cycle to provide efficient operation over a wide range of temperatures. Such cycles are embodied in Stirling type engines which can be powered for reverse operation by an electric motor.

Heat may be transferred from a low to a high temperature reservoir by a heat pump located therebetween, but it is preferable to separate the heat pump from the reservoirs and transfer heat by a thermal exchange fluid. The inner reservoir 11 which is at an extreme high temperature receives heat from a thermal exchange fluid, not shown, which is forced to circulate by a pump 41 in a path which includes heat exchanger 42, conduits 43, and heat exchanger 44. Similarly, the surrounding reservoir 12 which is at a moderate high temperature releases heat to a thermal exchange fluid which is forced by a pump 46 to circulate in a path which includes heat exchanger 47, conduits 48, and heat exchanger 49.

Heat is transmitted through insulating materials at a rate which is proportional to the ratio of temperature difference to thermal impedence. For latent heat storing materials over a wide range of charge, the temperature and heat loss are substantially constant. The latent heat storing material 14 of the inner reservoir loses heat to the latent heat storing material 16 of the surrounding reservoir which loses heat to ambient air. Accordingly, discharge of the surrounding reservoir is at least partly compensated by charging from the inner reservoir so that as time passes remaining thermal capacity becomes substantially greater in the surrounding than in the inner reservoir. This unbalanced capacity is undesirable since the moderate temperature reservoir cannot satisfy the extreme temperature requirements of users. In order to restore a balance of capacity, the heat pump and fluid circuits operate to transfer heat from the surrounding to the inner reservoir. Pumps 41 and 46 circulate thermal exchange fluid which flows through heat exchangers 47 and 49 to absorb heat from the surrounding reservoir 12 for transfer to the heat pump and thermal exchange fluid also flows through heat exchangers 42 and 44 to absorb heat from the heat pump for transfer to the inner reservoir. The quantity of heat transferred to the inner reservoir is equivalent to the heat absorbed from the surrounding reservoir and the work expended by the heat pump to execute the reverse Carnot cycle. The efficiency of this process is indicated by the example of an inner reservoir at an extreme temperature of 300° C. (573° K.) and a surrounding reservoir at a moderate temperature of 150° C. for which the theoretical Cp is 3.82.

A nested cold reservoir assembly has the hot and cold sides of the heat pump interchanged so that as the heat pump and fluid circuits operate heat is transferred from the heat exchanger 44, through heat exchanger 42, to the heat pump, to heat exchanger 47, and to heat exchanger 49 thereby recharging the inner reservoir which is at an extreme cold temperature. In the example of an inner reservoir at −29° C. and an outer reservoir at 0° C. (273° K.), the Cp is 9.45.

Figure 2:
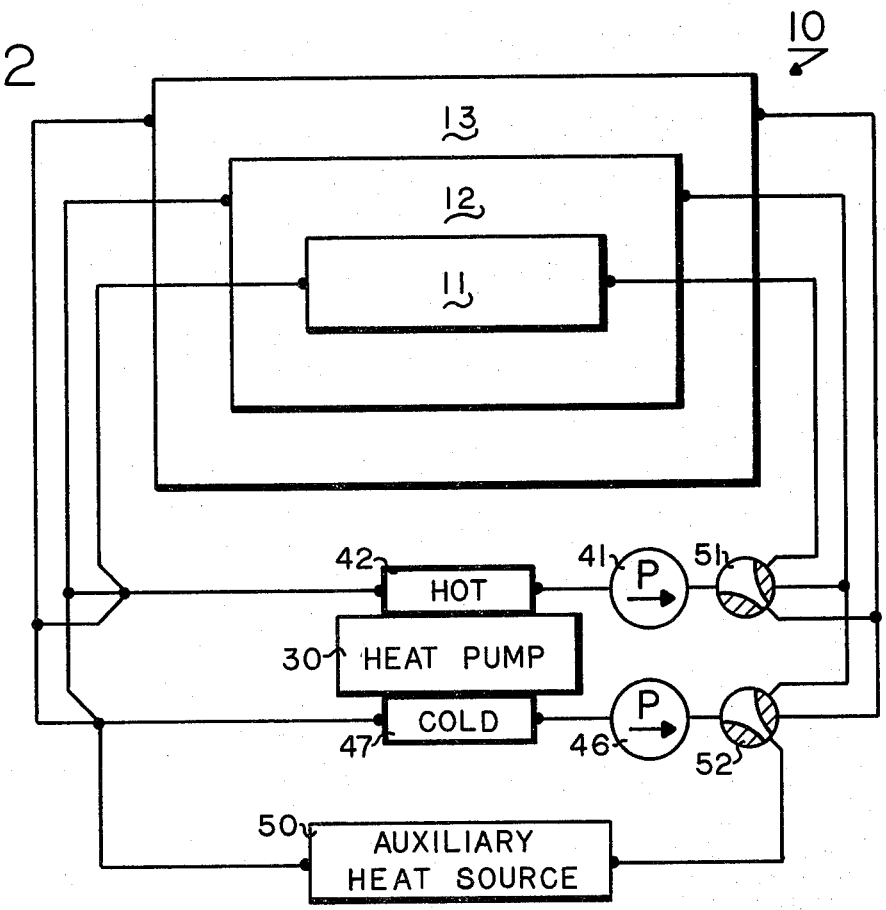
FIG. 2 is a schematic drawing of the invention having a single heat pump to transfer heat between selected pairs of thermal reservoirs and to charge the reservoirs from an auxiliary heat source.

FIG. 2 extends the elementary embodiment to include an additional thermal reservoir 13, an auxiliary heat source 50 for reservoir charging, and selector valves 51 and 52 which selectively connect the single heat pump between the reservoirs and the auxiliary heat source. The nested reservoir assembly 10 comprises the inner reservoir 11 and surrounding reservoir 12 as were described with reference to FIG. 1 and a third surrounding reservoir 13 comprising a heat storing material and a thermal insulating material, not shown, which surround reservoir 12. Temperatures of the three reservoirs are progressively more moderate in an outward direction.

The reservoir assembly 10 is charged by heat transferred from the auxiliary heat sink to each reservoir. With selector valves 51 and 52 in the position shown, the heat pump operates to develop hot and cold surfaces and pumps 41 and 46 circulate thermal exchange fluid. Heat is transferred from heat exchanger 42 to reservoir 13 by a heat exchanger therein, not shown. As reservoir 13 attains a predetermined temperature, selector valve 51 is positioned to enable flow of thermal exchange fluid through reservoir 12. When the temperature of latent heat storing material in reservoir 12 increases substantially above its phase transition temperature thereby indicating a full charge, selector valve 51 is positioned to enable flow of thermal exchange fluid through reservoir 11. As the temperature of reservoir 11 increases substantially above the phase transition temperature of latent heat storing material therein, the heat pump and pumps 41 and 46 are turned off.

Heat flows outward to partly discharge the inner reservoirs which are then recharged according to the invention by transfer of heat therebetween through the heat pump. The heat pump and pumps 41 and 46 operate. Selector valve 52 is positioned to enable flow of thermal exchange fluid through heat exchanger 47 and reservoir 12. Selector valve 51 is positioned to enable flow of thermal exchange fluid through heat exchanger 42 and reservoir 11 until reservoir 11 is recharged as indicated by a temperature increase. Selector valve 52 is then positioned to enable flow of thermal exchange fluid through heat exchanger 47 and reservoir 13 and selector valve 51 is positioned to enable flow of thermal exchange fluid through heat exchanger 42 and reservoir 12 until reservoir 12 is recharged.

FIG. 3 shows the elementary embodiments of FIGS. 1 and 2 incorporated into a fluid heat transfer system in which heat is exchanged between thermal reservoirs and users such as domestic appliances. The heat transfer between reservoirs through a heat pump according to the invention is one function of a reservoir charging system comprising a thermal exchange fluid and conduits therefor, hot reservoir assembly 10A, cold reservoir assembly 10B, auxiliary heat sources 50A and 50B with selector valve 53, heat pump 30 with heat exchanger 42 on the hot surface and heat exchanger 47 on the cold surface, pumps 41 and 46 for forcing flow of the thermal exchange fluid, and selector valve manifolds 56A, 56B, 57A, and 57B. The selector valve manifolds comprise conventional digital valves which are programmed to allow only one valve at a time to be open in each manifold. Like numbered manifolds are interconnected so that like numbered valves therein are in the same state.

The hot reservoir assembly 10A comprises a plurality of reservoirs in a nested configuration each having a heat storing material, a heat exchanger connecting to the fluid circuits, and a surrounding thermal insulation, not shown. Inner reservoir 11A at an extreme temperature is surrounded by reservoir 12A at a moderate temperature which is surrounded by reservoir 13A at a yet more moderate temperature. A similarly structured cold reservoir assembly 10B comprises inner reservoir 11B at an extreme temperature surrounded by reservoir 12B at a moderate temperature.

As an example of operation according to the invention, heat is transferred from reservoir 12A to 11A by operating the heat pump and pumps 41 and 46, opening valves 1 in manifolds 56A & B, and opening valves 2 in manifolds 57A&B. Thermal exchange fluid circulates through heat exchanger 42 and reservoir 11A to transfer heat from the hot surface of the heat pump to reservoir 11A. The thermal exchange fluid also circulates through heat exchanger 47 and reservoir 12A to transfer heat from reservoir 12A to the cold surface of the heat pump thereby recharging reservoir 11A with heat which was previously lost to reservoir 12A.

Auxiliary heat sources 50A and 50B include inside and outside radiators to exchange heat with ambient air, water preheaters to exchange heat with incoming water, and solar collectors. Each of the auxiliary heat sources has a heat exchanger therein, not shown, through which thermal exchange fluid can flow. As an example of operating the system to charge a reservoir 12A, an auxiliary heat source such as 50A having the least temperature difference with the reservoir is selected. Selector valve 53 is positioned to connect the heat exchanger in auxiliary heat source 50A to conduits connecting to the manifolds 56A&B and 57A&B. Valves 4 in manifolds 57A&B are opened. Valves 2 in manifolds 56A&B are opened. The heat pump and pumps 41 and 46 operate to transfer heat from auxiliary heat source 50A to reservoir 12A. In another example of charging the reservoirs, heat is transferred from reservoir 12B to reservoir 13A. Valves 6 in manifolds 57A&B and valves 3 in manifolds 56A&B are opened. The heat pump and pumps 41 and 46 operate to cool reservoir 12B and to heat reservoir 13A. Other useful transfers of heat between combinations of reservoirs with other reservoirs and auxiliary heat sinks are apparent.

A plurality of users such as 61 and 62 connect through fluid circuits to each of the reservoirs. The system of fluid circuits and reservoirs enables a single heat exchanger in the user to provide both heating and cooling. For domestic appliance users, the heating and cooling capability increases the range of food processing environments as the description of a pressure cooking appliance in my U.S. Pat. No. 4,246,955 illustrates. The system also improves overall energy of food processing and its effects through both energy conservation and improved use of available or free energy in the sense of the second law of thermodynamics. Energy is conserved for example by returning the appliance heat which remains after cooking to the reservoirs thereby enabling reuse of the heat at a lower free energy and further reducing air conditioner load for a kitchen. Improved use of available energy over conventional appliances, which have a maximum effective Cp of one, is provided by using electrical energy to operate a heat pump together with programming an appliance to select for heat exchange that reservoir having the most moderate temperature which provides satisfactory performance.

The user 61 heat exchanger connects to hot mains 63 and cold mains 64 through regulator valve 65 and selector valves 66A and 66B which are interconnected to be in the same position. Similarly, the user 62 heat exchanger connects to the hot mains 63 and cold mains 64 through regulator valve 67 and selector valves 69A and 68B which are also interconnected to be in the same position. Reservoirs 11A, 12A, and 13A are connected one at a time to the hot mains 63 through selector valves 71A and 71B which are interconnected to be in the same position and through pump 72. Reservoirs 11B and 12B similarly are connected one at a time to the cold mains 64 through selector valves 76A and 76B which are interconnected to be in the same position and through pump 77.

As an example of heat exchange, user 61 exchanges heat with reservoir 12A. Selector valves 71A&B are positioned to enable flow of thermal exchange fluid through reservoir 12A, pump 72 operates to develop a differential pressure between the hot mains 63, selector valves 66A&B are positioned to connect to the hot mains 63 and regulator valve 65 opens. Thermal exchange fluid circulates in a path which includes the heat exchanger in user 61 and the heat exchanger in reservoir 12A to exchange heat therebetween.

The users, hot and cold reservoir assemblies, auxiliary heat sources, heat pump, pumps and valves are controlled by a computer and controller 80 which is conventional. The computer generates a sequence of temperature setpoints in real time for the users and reservoirs. The controller receives temperature information from sensors in the users, reservoirs, and auxiliary heat sources. Electrical power is transmitted by the controller to operate the selector valves, regulator valves, pumps, and heat pump to attain the setpoint temperatures according to conventional servosystem principles.

As an example of computer controlled operation of the system, the reservoirs are charged and a pressure cooking appliance is heated and cooled to process food. During off-peak hours, a timer in the computer initiates generation of temperature setpoints for each of the reservoirs. The computer scans temperatures of the auxiliary heat sources and reservoirs to select combinations thereof for efficient heat exchange according to stored programs. In the case of heat transfer between auxiliary heat source 50B and reservoir 13A, the controller transmits electrical power to an operator, not shown, of selector valve 53 to enable flow of thermal exchange fluid through the auxiliary heat source 50B. The controller also transmits electrical power to motors of pumps 41 and 46, to the heat pump, to the operators of valves 4 in manifolds 57A&B, and to the operators of valves 3 in manifolds 56A&B. The thermal exchange fluid flows in one fluid circuit which transfer heat from the auxiliary heat source 50B to the cold surface of the heat pump and flows in another fluid circuit which transfers heat from the hot surface of the heat pump to the reservoir 13A. Similar operations complete charging of the reservoirs. Operation of the pressure cooking appliance begins with a recipe display from the computer which a cook may modify by specifying desired food qualities such as degree of surface browning and center rareness of a roast. The computer generates setpoints for temperature in real time and may also generate setpoints for other variables such as pressure, partial pressure of water vapor, and flow velocity of gases within the appliance. The roast is placed in the appliance, which is user 61 and serving time is entered into the computer. The first temperature setpoint results in refrigeration until a cooking phase begins. The controller transmits power to operators of selector valves 66A&B for connection to cold mains 64 and transmits power to an operator of regulator valve 65 as required to minimize the difference between appliance and setpoint temperature. The controller transmits power to the motor of pump 77 and to the operator of selector valves 76A&B to enable flow of thermal exchange fluid through reservoir 12B and through the user 61 thereby refrigerating the appliance. When the computer generates a setpoint for the cooking phase, the appliance exchanges heat with the hot reservoir assembly 10A. The transition to a high temperature includes a progression through reservoirs 13A, 12A, and 11A for energy efficiency. The controller causes selector valves 66A&B to connect to the hot main 63, the regulator valve 65 to open and close as required to track the setpoint, and pump 72 to operate. Selector valves 71A&B are positioned to connect reservoir 13A to the hot mains 63. When the temperature sensor in the appliance indicates a predetermined difference from the temperature of reservoir 13A, selector valves 71A&B are positioned to connect reservoir 12A to the hot mains 63. When another predetermined difference between the temperatures of the reservoir 12A and the appliance is attained, selector valves 71 71A&B are positioned to connect reservoir 11A to the hot mains 63 for heat exchange with the appliance and regulator valve 65 operates to maintain the setpoint temperature. When the computer generates a serving temperature setpoint, the hot appliance is cooled by transferring its heat to reservoir 13A. Selector valves 71A&B are positioned to connect reservoir 13A to the hot mains 63 and regulator valve 65 is operated such that thermal exchange fluid flows in a path which includes user 61 and reservoir 13A until a serving temperature is attained. The heat returned from the appliance to reservoir 13A together with heat lost by reservoir 12A may increase the heat content of reservoir 13A beyond anticipated demand as would be indicated by a substantial increase of temperature for heat stored in a sensible rather than latent mode. Heat is then transferred from reservoir 13A to 12A by the heat pump according to the invention. The controller responds to a difference between setpoint and sensed reservoir 13A temperature by transmitting power to operate the heat pump, pumps 41 and 46, to open valves 3 of manifolds 57A&B, and to open valve 2 of manifolds 56A&B. Such transmitted power is turned off when the temperature difference is nulled.

The system herein illustrated readily accommodates modifications such as additional reservoirs, auxiliary heat sources, various types of users, and alternative control means.

What I claim is:

1. A process for energy efficient recharging of an inner thermal reservoir at an extreme temperature by heat exchange with a surrounding thermal reservoir at a moderate temperature, comprising the steps of:
   selecting from a plurality of reservoirs in a nested configuration a pair of reservoirs for heat transfer therebetween,
   exchanging heat between a hot surface of a heat pump and the warmer reservoir of the selected pair, and
   exchanging heat between a cold surface of the heat pump and the cooler reservoir of the selected pair.

2. The process of claim 1 wherein the step of exchanging heat between the hot surface and the warmer reservoir comprises transporting a thermal exchange fluid between the hot surface and the warmer reservoir, and the step of exchanging heat between the cold surface and the cooler reservoir comprises transporting a thermal exchange fluid between the cold surface and the cooler reservoir.

3. The process of claim 1 wherein the heat pump transfers heat from the cold surface to the hot surface by compressing and expanding a noncondensible gas substantially in a reverse Carnot cycle.

4. A system of thermal reservoirs, comprising:
   a plurality of reservoirs in a nested configuration comprising an inner reservoir at an extreme temperature surrounded by a reservoir at a moderate temperature whereby heat flows to reduce the temperature difference therebetween,
   a heat pump having a hot surface and a cold surface,
   means for exchanging heat between the hot surface and the warmer of said reservoirs, and
   means for exchanging heat between the cold surface and the cooler of said reservoirs thereby using the surrounding reservoir as a heat source for recharging the inner reservoir.

5. The system of claim 4 wherein the means for exchanging heat between the hot surface and the warmer reservoir comprises a fluid circuit therebetween for circulating a thermal exchange fluid and the means for exchanging heat between the cold surface and the cooler reservoir comprises a fluid circuit therebetween for circulating a thermal exchange fluid.

* * * * *